United States Patent
Kalliomäki et al.

(10) Patent No.: US 11,223,792 B2
(45) Date of Patent: Jan. 11, 2022

(54) SUMMING-UP VIDEO FRAMES TO ENHANCE IMAGE BRIGHTNESS

(71) Applicant: Google LLC, Mountain View, CA (US)

(72) Inventors: Sami Kalliomäki, Stockholm (SE); Niklas Blum, Stockholm (SE); Stefan Ekerfelt, Stockholm (SE); Peter Hanspers, Stockholm (SE); Magnus Jedvert, Stockholm (SE)

(73) Assignee: Google LLC, Mountain View, CA (US)

( * ) Notice: Subject to any disclaimer, the term of this patent is extended or adjusted under 35 U.S.C. 154(b) by 79 days.

(21) Appl. No.: 16/712,715

(22) Filed: Dec. 12, 2019

(65) Prior Publication Data

US 2021/0185271 A1    Jun. 17, 2021

(51) Int. Cl.
*H04N 5/58*    (2006.01)
*G06T 5/00*    (2006.01)
(Continued)

(52) U.S. Cl.
CPC ............ *H04N 5/58* (2013.01); *G06T 5/009* (2013.01); *G06T 5/40* (2013.01); *G06T 5/50* (2013.01);
(Continued)

(58) Field of Classification Search
CPC ...... H04N 5/58; H04N 5/2351; H04N 5/2352; G06T 5/50; G06T 5/009; G06T 5/40; G06T 2200/28; G06T 2207/20072; G06T 2207/10016; G06T 2207/20216; G06T 2207/20208
See application file for complete search history.

(56) References Cited

U.S. PATENT DOCUMENTS 7,003,153 B1 * 2/2006 Kerofsky ............... G06T 5/009
                                                      348/E5.119
10,277,829 B1 * 4/2019 Garrido ............. H04N 5/23245
(Continued)

FOREIGN PATENT DOCUMENTS

CN    106412383         2/2017
CN    106412383 A  *    2/2017

OTHER PUBLICATIONS

WIPO, Written Opinion for International Patent Application No. PCT/US2020/045254, dated Oct. 8, 2020, 10 pages.
(Continued)

*Primary Examiner* — Nelson D. Hernández Hernández
(74) *Attorney, Agent, or Firm* — IP Spring (57) ABSTRACT

A method enhances brightness in video frames of a video during streams. The method includes determining, by a processor, that a first video frame has low light. The method further includes applying, by the processor, a linear correction to provide a first brightness enhancement in the first video frame that modifies a first brightness of a predetermined darkest percentage of pixels to be less than a darkness threshold value or a second brightness of a predetermined lightest percentage of the pixels to be greater than a lightness threshold value. The method further includes averaging, by the processor, the first brightness enhancement of the first video frame with a set of brightness enhancements corresponding to previous video frames to generate a modified video.

20 Claims, 7 Drawing Sheets
(1 of 7 Drawing Sheet(s) Filed in Color)

(51) Int. Cl.
*G06T 5/40* (2006.01)
*G06T 5/50* (2006.01)
*H04N 5/235* (2006.01)

(52) U.S. Cl.
CPC ......... *H04N 5/2351* (2013.01); *H04N 5/2352* (2013.01); *G06T 2200/28* (2013.01); *G06T 2207/10016* (2013.01); *G06T 2207/20072* (2013.01); *G06T 2207/20208* (2013.01); *G06T 2207/20216* (2013.01)

(56) References Cited

U.S. PATENT DOCUMENTS

| | | | |
|---|---|---|---|
| 2014/0253764 A1* | 9/2014 | Haas | G06T 5/008 348/243 |
| 2016/0189354 A1* | 6/2016 | Kikuchi | G06T 7/136 382/167 |
| 2018/0005359 A1 | 1/2018 | Deng | |
| 2019/0253623 A1* | 8/2019 | Lim | H04N 5/2353 |

OTHER PUBLICATIONS

WIPO, International Search Report for International Patent Application No. PCT/US2020/045254, dated Oct. 8, 2020, 4 pages.

* cited by examiner

SUMMING-UP VIDEO FRAMES TO ENHANCE IMAGE BRIGHTNESS

BACKGROUND

Video calling in dark environments may result in videos with low lighting where it is difficult to see the subject in the video. Manually increasing the exposure of the display may result in a subject's face looking overexposed. Correcting the brightness using hardware or software solutions that are computationally expensive can result in a reduced framerate of the streaming video due to the computational burden.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Embodiments generally relate to a method to enhance brightness in video frames of a video during streaming. The method includes determining, by a processor, that a first video frame has low light. The method further includes applying, by the processor, a linear correction to provide a first brightness enhancement in the first video frame that modifies a first brightness of a predetermined darkest percentage of pixels to be less than a darkness threshold value or a second brightness of a predetermined lightest percentage of the pixels to be greater than a lightness threshold value.

In some embodiments, the method further includes downscaling, by a graphics processing unit (GPU) distinct from the processor, the first video frame, wherein the first video frame is stored in a GPU memory of the GPU and wherein the GPU memory is not accessible by the processor, transferring, by the GPU, the downscaled first video frame to a computer processing memory accessible by the processor, and generating, by the processor, a histogram of brightness of the downscaled first video frame, wherein the linear correction is applied to the first video frame by the GPU. In some embodiments, a number of video frames in the set of video frames that are averaged is based on at least one of a frame speed of the video or an input brightness of the first video frame. In some embodiments, the first video frame is determined to have low light based on at least one of an ambient light sensor value failing to meet a first threshold value or an exponential moving average frame brightness fails to meet a second threshold value. In some embodiments, the first brightness enhancement of the first video frame is averaged with a set of brightness enhancements corresponding to previous video frames to generate a modified video. In some embodiments the video frames are captured by a camera coupled to the processor and the method further includes determining, by the processor, whether the modified video meets a brightness threshold, responsive to determining that the modified video does not meet the brightness threshold, changing, by the processor, one or more camera settings, and responsive to determining that the modified video does meet the brightness threshold, displaying the modified video. In some embodiments, changing the one or more camera settings includes at least one of increasing an exposure time or modifying a sensitivity of an image sensor. In some embodiments, the method further includes applying contrast limited adaptive histogram equalization (CLAHE) to the first video frame. In some embodiments, applying the CLAHE to the first video frame includes: (a) applying CLAHE to a luma channel of the first video frame, (b) applying CLAHE to each chroma channel of the first video frame, and (c) blending results from (a) and (b). In some embodiments, the method further includes determining a total brightness of the first video frame by calculating a square root of a summation of an average brightness of a set of frames where each frame in the set of frames is squared, determining a multiplier that is 0.5 divided by the total brightness, and determining a final output value by multiplying the multiplier by a square root of a summation of an input value for the first video frame squared. In some embodiments, determining the total brightness includes determining that a first total brightness exceeds a threshold value, responsive to the first total brightness exceeding the threshold value, removing a second frame from the set of frames, and calculating a second total brightness.

A non-transitory computer-readable medium may include instructions stored thereon that, when executed by one or more computers, cause the one or more computers to perform operations, the operations comprising: determining that a first video frame has low light and applying a linear correction to provide a first brightness enhancement in the first video frame that modifies a first brightness of a predetermined darkest percentage of pixels to be less than a darkness threshold value or a second brightness of a predetermined lightest percentage of the pixels to be greater than a lightness threshold value.

In some embodiments, the operations further comprise downscaling, by a graphics processing unit (GPU) distinct from the processor, the first video frame, wherein the first video frame is stored in a GPU memory of the GPU and wherein the GPU memory is not accessible by the processor, transferring, by the GPU, the downscaled first video frame to a computer processing memory accessible by the processor, and generating, by the processor, a histogram of brightness of the downscaled first video frame, wherein the linear correction is applied to the first video frame by the GPU. In some embodiments, a number of video frames in the set of video frames that are averaged is based on at least one of a frame speed of the video or an input brightness of the first video frame. In some embodiments, the first video frame is determined to have low light based on at least one of an ambient light sensor value failing to meet a first threshold value or an exponential moving average frame brightness fails to meet a second threshold value. In some embodiments, the operations further include averaging the first brightness enhancement of the first video frame with a set of brightness enhancements corresponding to previous video frames to generate a modified video A system may comprise one or more processors; and a memory that stores instructions executed by the one or more processors, the instructions comprising: determining that a first video frame has low light and applying a linear correction to provide a first brightness enhancement in the first video frame that modifies a first brightness of a predetermined darkest percentage of pixels to be less than a darkness threshold value or a second brightness of a predetermined lightest percentage of the pixels to be greater than a lightness threshold value.

In some embodiments, the instructions further comprise downscaling, by a graphics processing unit (GPU) distinct from the processor, the first video frame, wherein the first video frame is stored in a GPU memory of the GPU and wherein the GPU memory is not accessible by the processor, transferring, by the GPU, the downscaled first video frame to a computer processing memory accessible by the processor, and generating, by the processor, a histogram of brightness of the downscaled first video frame, wherein the linear correction is applied to the first video frame by the GPU. In some embodiments, a number of video frames in the set of video frames that are averaged is based on at least one of a frame speed of the video or an input brightness of the first video frame. In some embodiments, the first video frame is determined to have low light based on at least one of an ambient light sensor value failing to meet a first threshold value or an exponential moving average frame brightness fails to meet a second threshold value. In some embodiments, the instructions further include averaging the first brightness enhancement of the first video frame with a set of brightness enhancements corresponding to previous video frames to generate a modified video.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure is illustrated by way of example, and not by way of limitation in the figures of the accompanying drawings in which like reference numerals are used to refer to similar elements.

DETAILED DESCRIPTION

To solve the problem of providing high-quality video in low-light settings, techniques are described herein to enhance brightness of a video frame. First, it is determined whether a user consented to light-light mode. If the user did not consent to low-light mode, the method waits until user consent is provided, if at all. If the user did consent to low-light mode, the video application analyzes video frames to determine that a first video frame has low light. A correction is performed on the first video frame to generate a modified video. For example, a linear correction, a contrast limited adaptive histogram equalization correction, or a total brightness determination is applied to provide a brightness enhancement in the first video frame.

The video application determines whether the modified video satisfies a brightness threshold. If the modified video satisfies a brightness threshold, subsequent video frames are analyzed to determine if they have low light. If the modified video fails to satisfy the brightness threshold, one or more camera settings are changed.

The various embodiments described below have several advantages. First, the brightness enhancement avoids overexposure of a subject in the video or lowering of the frame rate by analyzing the distribution of brightness values instead of using an average brightness value. Second, the technique described below includes an averaging of a first brightness enhancement associated with a first video frame with a set of brightness enhancements corresponding to previous video frames to generate a modified video with reduced noise created from amplification that occurs during enhancement of the video frames.

Example Environment

Figure 1:
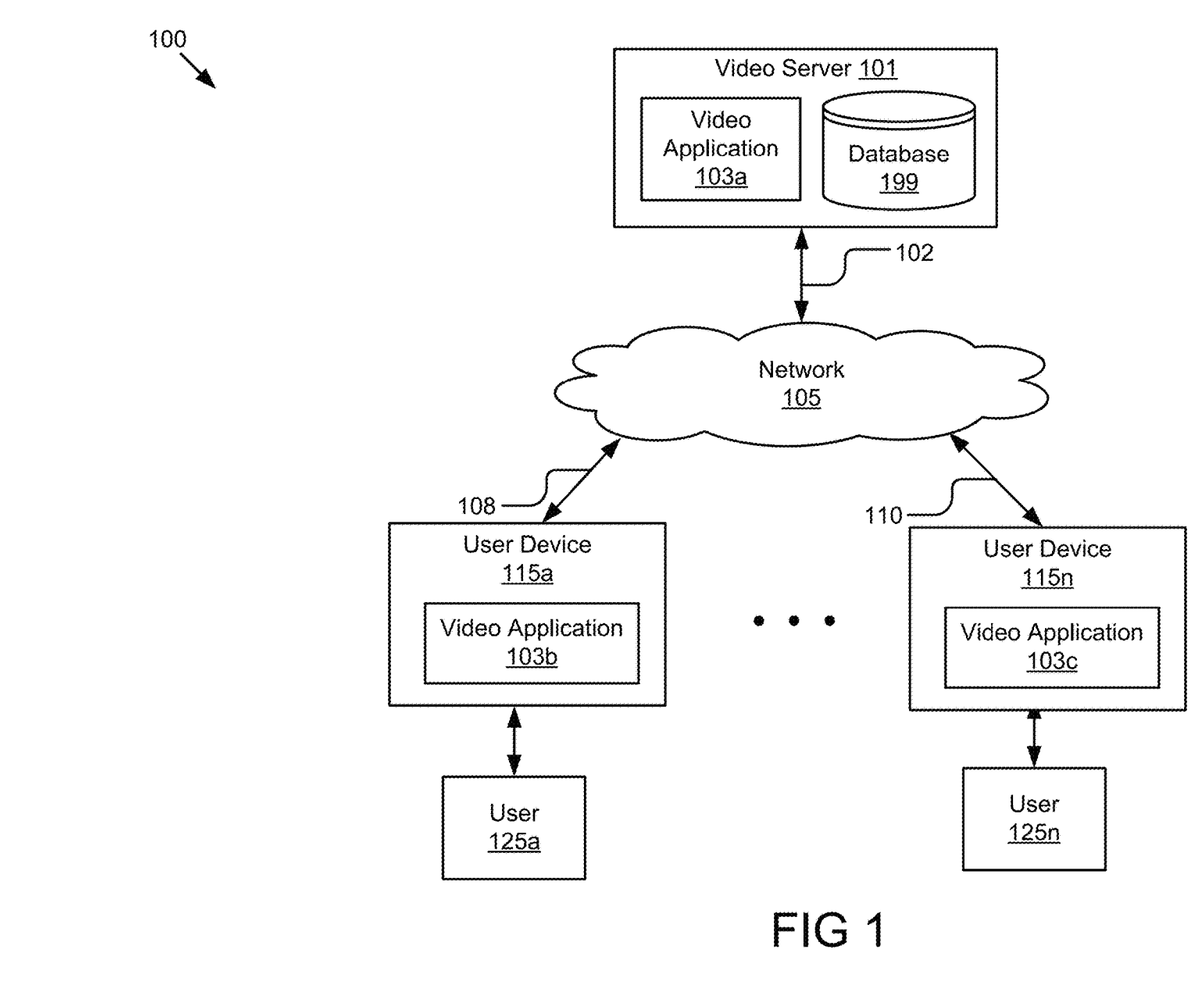
FIG. 1 illustrates a block diagram of an example environment in which a brightness of video frames is enhanced according to some embodiments.

FIG. 1 illustrates a block diagram of an example environment 100 in which a brightness of video frames is enhanced. The illustrated environment 100 includes a video server 101, user devices 115a, 115n, and a network 105. Users 125a, 125n may be associated with respective user devices 115a, 115n. In some embodiments, the environment 100 may include other servers or devices not shown in FIG. 1 or the video server 101 may not be included. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

The video server 101 may include a processor, a memory, and network communication hardware. In some embodiments, the video server 101 is a hardware server. The video server 101 is communicatively coupled to the network 105 via signal line 102. Signal line 102 may be a wired connection, such as Ethernet, coaxial cable, fiber-optic cable, etc., or a wireless connection, such as Wi-Fi®, Bluetooth®, or other wireless technology. In some embodiments, the video server 101 sends and receives data to and from one or more of the user devices 115a, 115n via the network 105. The video server 101 may include a video application 103a and a database 199.

The video application 103a may include code and routines operable to enhance brightness of video frames and/or transmit modified video to another user device 115n. In some embodiments, the video application 103a may be implemented using hardware including a central processing unit (CPU), a field-programmable gate array (FPGA), an application-specific integrated circuit (ASIC), any other type of processor, or a combination thereof. In some embodiments, the video application 103a may be implemented using a combination of hardware and software.

The database 199 may store video including the modified video received from user devices 115. Video is stored when the user associated with the client device that generates the modified video provides permission to store the video. The database 199 may store videos that are indexed and associated with identities of the users 125 of the mobile devices 115. For example, a video may be indexed in association with metadata that describes the user 125 as a member of a social network including a link to a profile of the member of the social network. The database 199 may also store social network data associated with users 125, user preferences for the users 125, etc.

In some embodiments, the video application 103 may perform facial recognition on the video frames. In situations in which the systems and methods discussed herein may collect or use personal information about users (e.g., user data, information about a user's social network, storage and analysis of video by the video application 103, etc.), users are provided with opportunities to control whether personal information is collected, whether the personal information is stored, whether the personal information is used, whether the images or videos are analyzed, and how information about the user is collected, stored, and used. That is, the systems and methods discussed herein may collect, store, and/or use user personal information only upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed.

The user device 115 may be a computing device that includes a memory and a hardware processor. For example, the user device 115 may include a desktop computer, a mobile device, a tablet computer, a mobile telephone, a wearable device, a head-mounted display, a mobile email device, a portable game player, a portable music player, a reader device, or another electronic device capable of accessing a network 105.

In the illustrated implementation, user device 115a is coupled to the network 105 via signal line 108 and user device 115n is coupled to the network 105 via signal line 110. Signal lines 108 and 110 may be wired connections, such as Ethernet, coaxial cable, fiber-optic cable, etc., or wireless connections, such as Wi-Fi®, Bluetooth®, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some embodiments, the user device 115 can be a wearable device worn by the user 125. For example, the user device 115a is included as part of a clip (e.g., a wristband), part of jewelry, or part of a pair of glasses. In another example, the user device 115a can be a smart watch. The video application 103b may generate video frames with enhanced brightness that are streamed from the user device 115a.

In some embodiments, the user device 115a may include a video application 103b that generates video frames with enhanced brightness for a video call. The video application 103b may determine that a first video frame has low light, apply a correction to the first video frame that enhances the brightness, averages the brightness enhancement for the first video frame with a set of brightness enhancements corresponding to previous video frames to generate a modified video, and transmits the modified video with enhanced brightness to the user device 115. The video application 103b may repeat this process for additional frames from a series of video frames, e.g., captured by user device 115a during a video call.

The user device 115a may transmit a video stream, e.g., that includes the set of video frames, during the video call over network 105 directly to the user device 115n or via the video server 101. The user device 115n may include a video application 103c that displays the video stream.

In the illustrated implementation, the entities of the environment 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 includes Bluetooth® communication networks, WiFi®, wireless local area network (WLAN) computer communication specified by IEEE 902.11, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the video server 101, in practice one or more networks 105 may be coupled to these entities.

Example Computing Device

Figure 2:
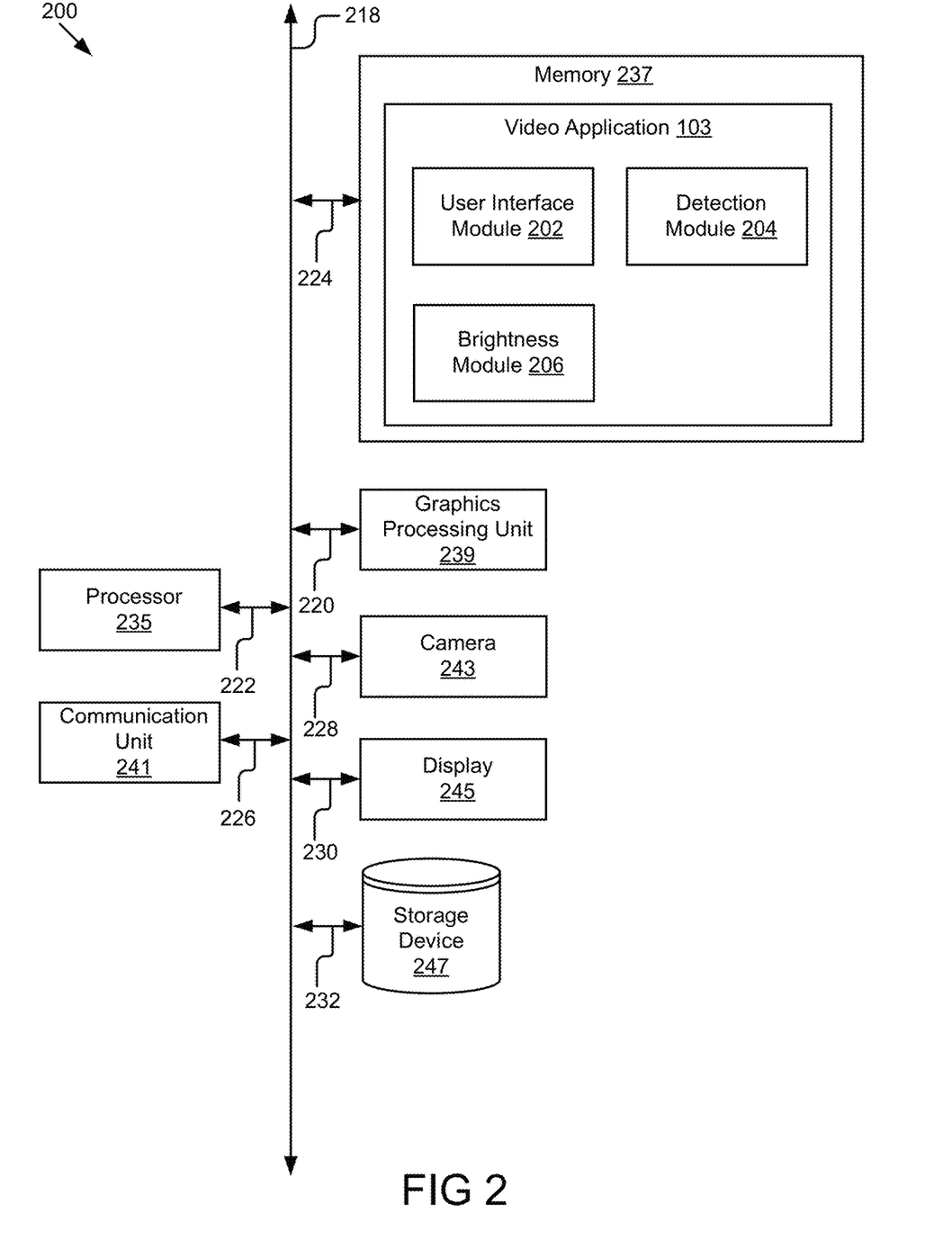
FIG. 2 illustrates a block diagram of an example computing device that enhances the brightness of video frames according to some embodiments.

FIG. 2 illustrates a block diagram of an example computing device 200 that enhances the brightness of video frames. The computing device 200 may be a user device 115 or a video server 101. The computing device 200 may include a processor 235, a memory 237, a graphics processing unit (GPU) 239, a communication unit 241, a camera 243, a display 245, and a storage device 247. Additional components may be present or some of the previous components may be omitted depending on the type of computing device 200. A video application 103 may be stored in the memory 237. In some embodiments, the computing device 200 may include other components not listed here, such as a battery, etc. The components of the computing device 200 may be communicatively coupled by a bus 218. Bus 218 may be a communication bus that carries signals between various parts of computing device 200.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 220 for communication with the other components via signal line 222.

The memory 237 stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the video application 103, which is described in greater detail below. The memory 237 is coupled to the bus 220 for communication with the other components via signal line 224.

The graphics processing unit (GPU) 239 may include hardware operable to downscale video frames. In some embodiments, the GPU 239 includes a GPU memory, such as a frame buffer, that stores instructions that may be executed by the GPU 239 and/or data. The instructions may include code and/or routines to downscale video frames. In some embodiments, the GPU 239 generates the downsampled video frame by sampling single pixels in the video frame. In some embodiments, an original video frame and the corresponding downscaled video frame is stored in the memory of the GPU 239. GPU 239 may transfer the downscaled video frame to the memory 237 associated with the processor 239. In some implementations, GPU 239 may include a large number of processing cores, e.g., 256 cores, 1000 cores, etc. that can perform operations in parallel. For example, downscaling a video frame may be performed by partitioning the video frame into a plurality of regions and downscaling each region using a separate core of the GPU. Such operation can provide a downscaled video frame at a rate that can allow processing streaming video, e.g., video that is captured, modified, and streamed from a client device that includes GPU 239 to other devices over a network. In some implementations, GPU 239 may be coupled to processor 235 via a dedicated communication channel and may be isolated from other components of device 200. In some implementations, GPU 239 may be coupled to the bus 220 for communication with the other components via signal line 220.

The communication unit 241 transmits data to and receives data from at least one of the user devices 115 and the video server 101 depending upon where the video application 103 may be executed. In some embodiments, the communication unit 241 includes a wireless transceiver for exchanging data with the user device 115, video server 101, or other communication channels using one or more wireless communication methods, including IEEE 802.11, IEEE 802.16, Bluetooth® or another suitable wireless communication method. The communication unit 241 is coupled to the bus 220 for communication with the other components via signal line 226.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some embodiments, the communication unit 241 includes a wired port and/or a wireless transceiver. The communication unit 241 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The camera 243 may include hardware operable to capture video frames. For example, the camera 243 may receive instructions from the user interface module 206 to start capturing video frames for a video call. The camera 243 may include one or more ambient light sensors, image sensors, e.g., CMOS sensors, depth sensors (e.g., infrared sensor, time-of-flight sensor, etc.), and/or other types of sensors. The ambient light sensor may be a photodetector that is used to sense the amount of ambient light present in the environment. In some implementations, camera 243 may include a plurality of lenses or other image capture units. Depth sensors may capture depth data that indicates a depth (distance) from the camera of one or more pixels of a captured image or video. The camera 243 may receive instructions from the video application 103 to perform at least one of increasing an exposure time or modifying a sensitivity of an image sensor. For example, the camera 243 may modify the image sensor by modifying an ISO setting. The camera 243 is coupled to the bus 220 for communication with the other components via signal line 228.

The display 245 may include hardware operable to display graphical data received from the video application 103. For example, the display 245 may render graphics to display video frames for a video. Display 245 may be any type of display, e.g., a liquid crystal display (LCD), OLED, etc. In some embodiments, display 245 may be a projected screen. In some embodiments, e.g., when device 243 is an augmented reality device, display 245 may be a stereoscopic display. The display 245 is coupled to the bus 220 for communication with the other components via signal line 230.

The storage device 247 may be a non-transitory computer-readable storage medium that stores data that provides the functionality described herein. In embodiments where the computing device 200 is the video server 101, the storage device 247 may include the database 199 in FIG. 1. The storage device 247 may be a DRAM device, a SRAM device, flash memory or some other memory device. In some embodiments, the storage device 247 also includes a non-volatile memory or similar permanent storage device and media including a hard disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 232.

The video application 103 may include a user interface module 202, a detection module 204, and a brightness module 204.

The user interface module 202 generates graphical data to display a user interface. In some embodiments, the user interface module 202 includes a set of instructions executable by the processor 235 to generate the graphical data. In some embodiments, the user interface module 202 is stored in the memory 237 of the computing device 200 and can be accessible and executable by the processor 235.

In some embodiments, the user interface module 202 generates graphical data to display a user interface with options to initiate a video call and to modify settings associated with the call. The settings may include options for a low-light mode that, when enabled, enhances a brightness of the video frames of a video. A default setting may be for the low-light mode to be disabled. In some embodiments, a user may enable the low-light mode as a setting to be applied to all video calls. In some embodiments, the low-light mode may be a setting that can be enabled during a particular video call.

Figure 3A:
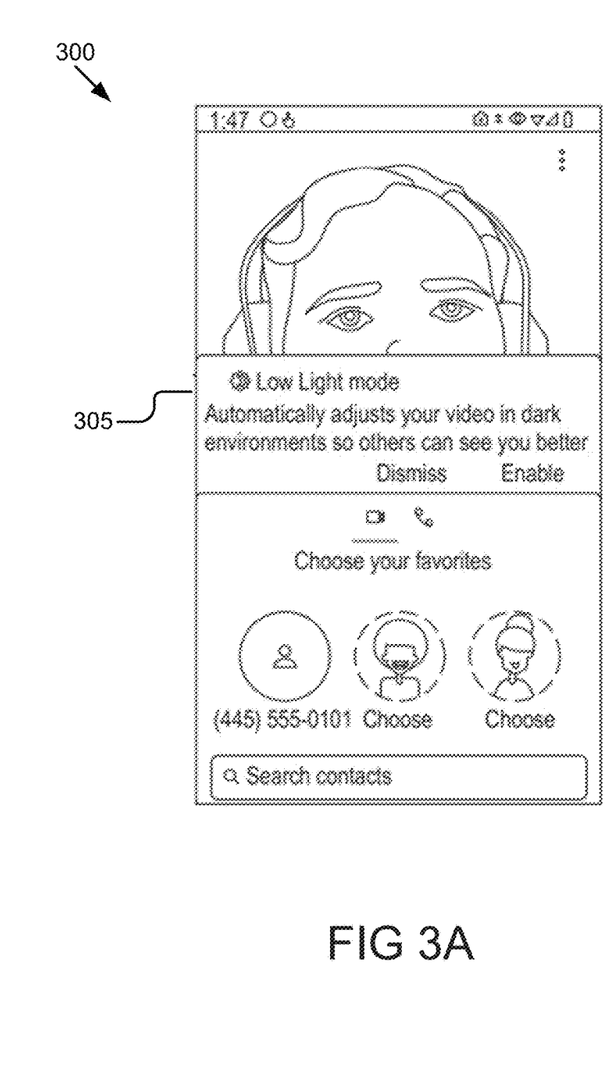
FIG. 3A illustrates an example user interface to enable a low-light mode according to some embodiments.

Turning to FIG. 3A, an example user interface 300 is illustrated that includes a low-light mode option 305 that can be enabled by selecting the "enable" option or the low-light mode option 305 may be dismissed by selecting the "dismiss" option. In this example, the low-light mode option 305 is made available before the video call is activated, but other options are possible. For example, the user interface module 202 may display a settings page with different video application options that include enabling the low-light mode. In some embodiments, once a video call has begun and the low-light mode is enabled, the low-light mode cannot be automatically turned off to avoid the low-light mode going between on and off too many times.

Figure 3B:
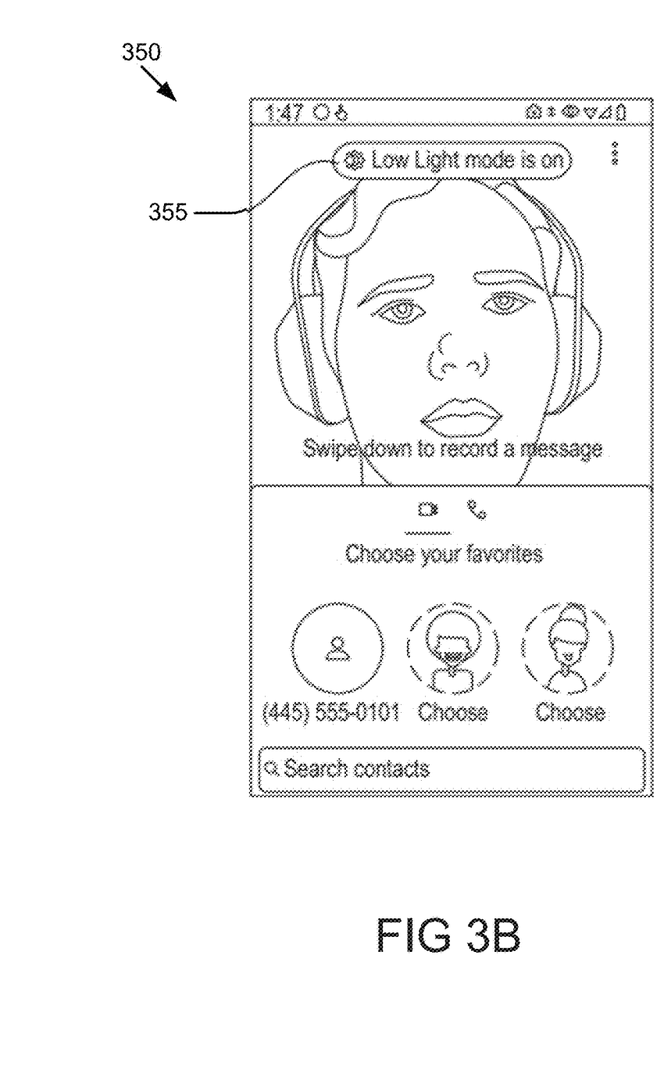
FIG. 3B illustrates an example of a user interface once the low-light mode is enabled according to some embodiments.

Turning to FIG. 3B, an example of a user interface 350 is illustrated once the low-light mode is enabled. In this example, the low-light mode option 355 informs the user that the low-light mode is enabled. The user may change the low-light mode by going to the settings.

The detection module 204 determines whether a video frame in a video has low light. In some embodiments, the detection module 204 includes a set of instructions executable by the processor 235 to determine low light in the video. In some embodiments, the detection module 204 is stored in the memory 237 of the computing device 200 and can be accessible and executable by the processor 235.

In some embodiments, the detection module 204 may check that the user provided user consent before determining that a video frame in a video has low light. In some embodiments where the low-light mode is not enabled, the detection module 204 may determine that the video frame in the video has low light and instruct the user interface module 202 to provide a notification to the user that the video has low light and suggest that the user enable low-light mode. In some embodiments, if the user dismisses the notification, the user interface module 202 may increase an exponential backoff where the user interface module 202 displays the notification after low light is detected an increasing number of days as the user continues to not enable low-light mode. For example, if the user does not enable low-light mode, the user interface module 202 waits one day to display the notification again, then 5 days, 25 days, 125 days, etc.

The detection module 204 may determine that a video frame in the video has low light based on one or more of an ambient light sensor value received from an ambient light sensor associated with the camera 243 or an exponential moving average frame brightness failing to meet a threshold value. In some embodiments, the detections module 204 may determine that the video frame has low light if both the ambient light sensor value fails to meet a first threshold value and the average frame brightness fails to meet a second threshold value. The average frame brightness is defined as the average luminance of pixels in the frame. For example, the detection module 204 may determine that the video is in low light if the ambient sensor value is less than 1 lux ambient light sensor value and the average frame brightness is less than 30%.

In some embodiments, the detection module 204 does not analyze every frame of the video in order to conserve power and/or battery life. Instead the detection module 204 may analyze every predetermined number of video frames, such as every 30$^{th}$ frame. In instances where the frame brightness is measured for every 30$^{th}$ frame, the detection module 204 is detecting the exponential moving average of every 30$^{th}$ frame brightness. In some embodiments, once low light is detected the detection module 204 may start analyzing the frame brightness of every frame.

In some embodiments, once the detection module 204 determines that the video frame has low light, the detection module 204 determines whether the user has provided consent to automatically provide a brightness enhancement or whether additional consent is required. For example, if additional consent is required the detection module 204 may instruct the user interface module 202 to generate a notification to display to the user to obtain user confirmation to instruct the brightness module 206 to provide the brightness enhancement.

The brightness module 206 provides a brightness enhancement to video frames to generate a modified video. In some embodiments, the brightness module 206 includes a set of instructions executable by the processor 235 to provide brightness enhancement of the video frames. In some embodiments, the brightness module 206 is stored in the memory 237 of the computing device 200 and can be accessible and executable by the processor 235.

In some embodiments, the brightness module 206 may one implement or more corrections to a video frame once the detection module 204 determines that the video frame has low light. For example, the brightness module 206 may apply a linear correction, a contrast limited adaptive histogram, or a total brightness formula (square root formula).

Example Linear Correction

In instances where the background of a video frame is dark, but a person in the video frame is well illuminated, some attempts to correct the brightness may include using a single average brightness value. This may result in the person looking overexposed. The linear correction solves this problem by looking at a distribution of brightness values and correcting sections with different levels of brightness.

In instances where a linear correction is performed, the brightness module 206 may receive a downscaled video frame from the memory 237 that the GPU 239 transferred to the memory 237. The GPU 239 performed the downscaling of the video frame and stored the first video frame in the GPU memory. In some embodiments, the GPU memory is not accessible by the processor 235.

The brightness module 206 may generate a histogram of brightness of the downscaled video frame that is used to calculate statistics about the downsampled video frame, such as a distribution of brightness values within the downscaled video frame. The brightness module 206 may identify the regions of the downscaled video frame that are excessively bright or excessively dark. For example, the brightness module 206 may identify a darkest fifth percentile of the downscaled video frame and transfer the statistics to the GPU 239, which applies the linear correction to the original video frame to correct the darkest fifth percentile to have a brightness of less than 20%. The brightness module 206 may also identify a brightest fifth percentile of the downscaled video frame. The brightness module 206 may transfer the statistics to the GPU 239, which applies the linear correction to the original video frame to correct the brightest fifth percentile to have a brightness of greater than 80%.

The GPU 239 may apply a linear correction to provide a brightness enhancement in the video frame that modifies a first brightness of a predetermined darkest percentage of pixels (e.g., darkest 5%) to be less than a darkness threshold value (e.g., greater than 20%) and a second brightness of a predetermined lightest percentage of the pixels (e.g., lightest 5%) to be greater than a lightness threshold value (e.g., greater than 80%).

The brightness module 206 may average multiple frames together to reduce noise caused by amplification. In some embodiments, a number of frames selected for averaging is based on at least one of a frame speed (frame rate) of the video or an average original brightness of the video frames. In some embodiments, the brightness module 206 uses a lower of the number of frames and the frame speed to determine how to ensure that the sum of the average frame brightness is at least 30% of the brightness. In some embodiments one frame is used where there are 0-10 frames per second (FPS); and for faster frame rates a maximum number of frames averaged may be two frames averaged where there are 10-15 FPS; three frames averaged where there are 15-20 FPS; and four frames averaged where there are greater than 20 FPS. In some embodiments, the brightness module 206 keeps an exponential moving average frame brightness for the averaged frames greater than 30%. In some embodiments, the brightness module 206 keeps the exponential moving average frame brightness between 30% and 70%.

Example Contrast Limited Adaptive Histogram Equalization (CLAHE) Correction

In some embodiments, the brightness module 206 uses a CLAHE correction to artificially increase a dynamic range of the first video frame. The CLAHE correction is a full-frame histogram equalization technique that brings out details in dark areas of the image even when parts of the image are well lit. The brightness module 206 may use the CLAHE correction instead of the linear correction, or as a supplemental correction.

Applying a CLAHE correction to the luma channel produces a brighter image, but the resultant frame may have less saturated colors than the original video frame. Applying the CLAHE correction to the chroma channels individually may increase saturation, but may also product color artifacts. As a result, to keep the color boosting within reasonable bounds, the brightness module 206 may blend the results of applying CLAHE to the luma channel and the chroma channels. For example, the brightness module 206 may apply the CLAHE to the video frame by: (a) applying CLAHE to a luma channel of the first video frame, (b) applying CLAHE to each chroma channel of the images, and (c) blending results from (a) and (b).

Figure 4A:
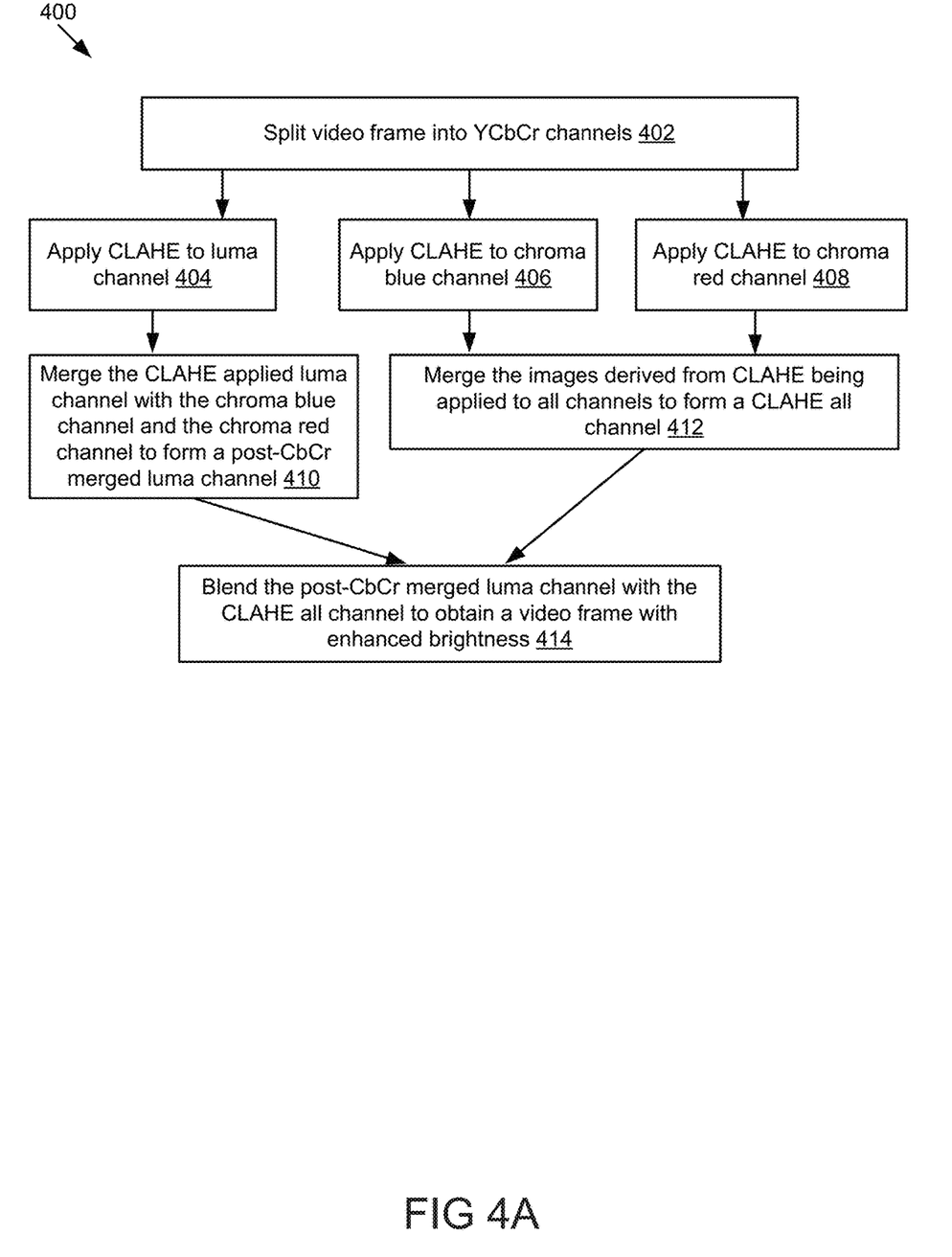
FIG. 4A illustrates a flowchart of an example method to apply a contrast limited adaptive histogram equalization (CLAHE) according to some embodiments.
Figure 4B:
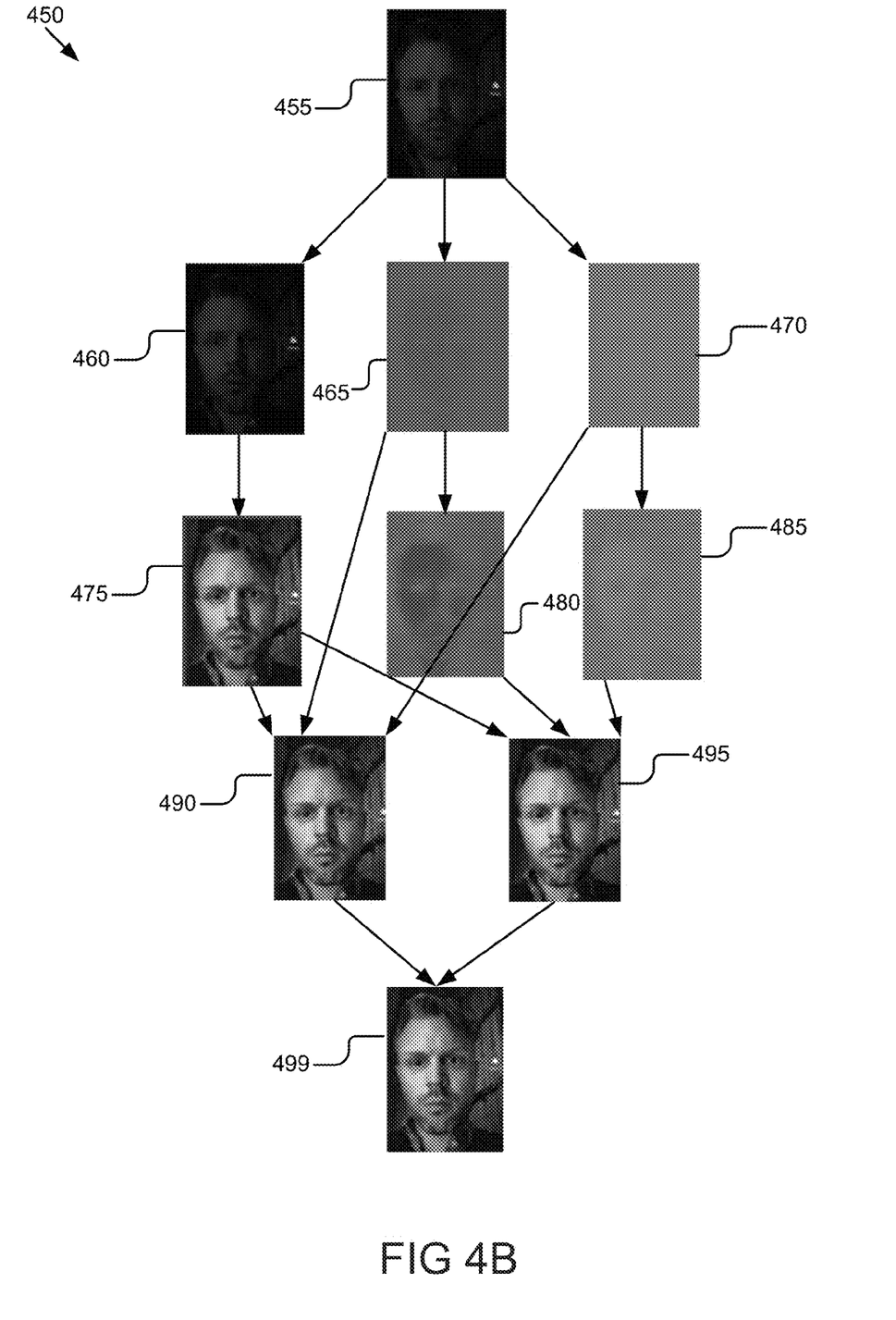
FIG. 4B illustrates a corresponding video frame that is altered using the CLAHE correction described in FIG. 4A according to some embodiments.

FIGS. 4A and 4B will be discussed together. FIG. 4A illustrates a flowchart 400 of an example method to apply the CLAHE correction. FIG. 4B illustrates corresponding stages 450 of the video frame that is altered using the CLAHE correction. At block 402 in FIG. 4A, a video frame is split into YCbCr channels where Y is the luma channel, Cb is the blue-difference chroma channel, and Cr is the red-difference chroma channel. In FIG. 4B, 455 is the original video frame. Splitting the original video frame 455 into YCbCr channels results in the luma channel (Y) 460, the chroma blue channel (Cb) 465, and the chroma red channel (Cr) 470.

At block 404 in FIG. 4A, the brightness module 206 applies CLAHE to the luma channel. This corresponds to the CLAHE applied luma channel 475 in FIG. 4B. At block 406 in FIG. 4A, the brightness module 206 applies CLAHE to the chroma blue channel. This corresponds to the CLAHE applied chroma blue channel 480 in FIG. 4B. At block 408 in FIG. 4A, the brightness module 206 applied CLAHE to the chroma red channel. This corresponds to the CLAHE applied chroma red channel 485 in FIG. 4B.

At block 410, the brightness module 206 merges the CLAHE applied luma channel 475 in FIG. 4B with the chroma blue channel 465 and the chroma red channel 470 in FIG. 4B to form a post-CbCr merged luma channel 490. At block 412, the brightness module 206 merges the images derived from CLAHE being applied to all channels to form a CLAHE all channel. Specifically, in FIG. 4B the CLAHE applied luma channel 475, the CLAHE applied chroma blue channel 480, and the CLAHE applied chroma red channel 485 are merged to form the CLAHE all channel 495 in FIG. 4B.

At block 414, the brightness module 206 blends the post-CbCr merged luma channel 490 with the CLAHE all channel 495 to obtain a video frame with enhanced brightness. In some embodiments, the brightness module 206 applies a 50/50 blend, which corresponds to the blended video frame 499 in FIG. 4B. Other blends are possible, such as a range from 10-90% of the CLAHE luma channel 490 with the remaining portion being the CLAHE all channel 495.

Example Total Brightness

In some embodiments, the brightness module 206 simulates longer exposure time by summing up multiple frames. Because the relationship between an amount of photons hitting the camera sensor and the value obtained in red green blue (RGB) is not linear, to get to a linear space, the brightness module raises the values to the power of 2.2 (assuming the camera 243 uses standard gamma). Then to get back to encoded space, which is subsequently decoded by a display of the receiving user device (for example user device 115n in FIG. 1), the brightness module 206 raises to the power 1/2.2. For simplicity and reduced computational complexity, a power of 2 and square-root of 2 may be used instead of 2.2.

The brightness module 206 may determine a total brightness of the frame by calculating a square root of a summation of an average brightness of a set of frames where each frame in the set of frames is squared. In some embodiments, for each video frame, the brightness module 206 uses previous video frames to determine the total brightness using the following formula:

$$\text{Total brightness} = \sqrt{\sum_{i=1}^{n} b_i^2} \quad (1)$$

where $b_1$ is the average brightness of the frame i and n is the number of frames.

In some implementations, the brightness module 206 makes calculations to achieve a brightness level of at least 0.3, which is an average brightness for each frame between 0 and 1. If a first total brightness exceeds a threshold brightness value (e.g., 0.7), the brightness module 206 removes a frame from a set of frames even if that would result in a total brightness level lower than 0.3. The brightness module 206 then uses a second total brightness calculated from the smaller set of frames. In some embodiments, the set of frames does not include frames older than 0.1 seconds as compared to the first frame because they may result in excessive ghosting if the camera framerate is low.

After the brightness module 206 determines a number of frames for the set of frames, the brightness module 206 calculates a multiplier that is equal to 0.5/total brightness. The multiplier may smooth out any fluctuations in the number of frames used by targeting a brightness level of 0.5. Other values may be used to obtain a different output brightness where a higher value results in a higher output brightness.

For each pixel in the video frame and each red green blue (RGB)-color channel, the brightness module 206 calculates a final output value. The brightness module 206 may use the following equation:

$$c_r = \text{multiplier} * \sqrt{\sum_{i=1}^{n} c_i^2} \quad (2)$$

where $C_r$ is the final output, and $c_i$ is the input value for frame i. The input value may be individual values for RGB color channels. Because each frame has multiple inputs and outputs, there may be one input value for each color channel for each pixel in the frame.

The brightness module 206 may use the total brightness to enhance the brightness of a video frame instead of the GPU 239 applying the linear correction or the brightness module 206 applying the CLAHE correction. In some embodiments, the brightness module 206 uses the total brightness in addition to another correction method.

In some embodiments, once the brightness module 206 implements the corrections to a video frame, the brightness module 206 determines whether the brightness of the modified video (e.g., a first video frame, a set of video frames, etc.) meets a threshold brightness. If the modified video fails to meet the threshold brightness, the brightness module 206 may change one or more of the camera settings. For example, the brightness module 206 may instruct the camera 243 to perform at least one of increasing an exposure time or modifying a sensitivity of an image sensor. The brightness module 206 may modify the image sensor by instructing the camera 243 to modify an ISO setting.

Example Method

Figure 5:
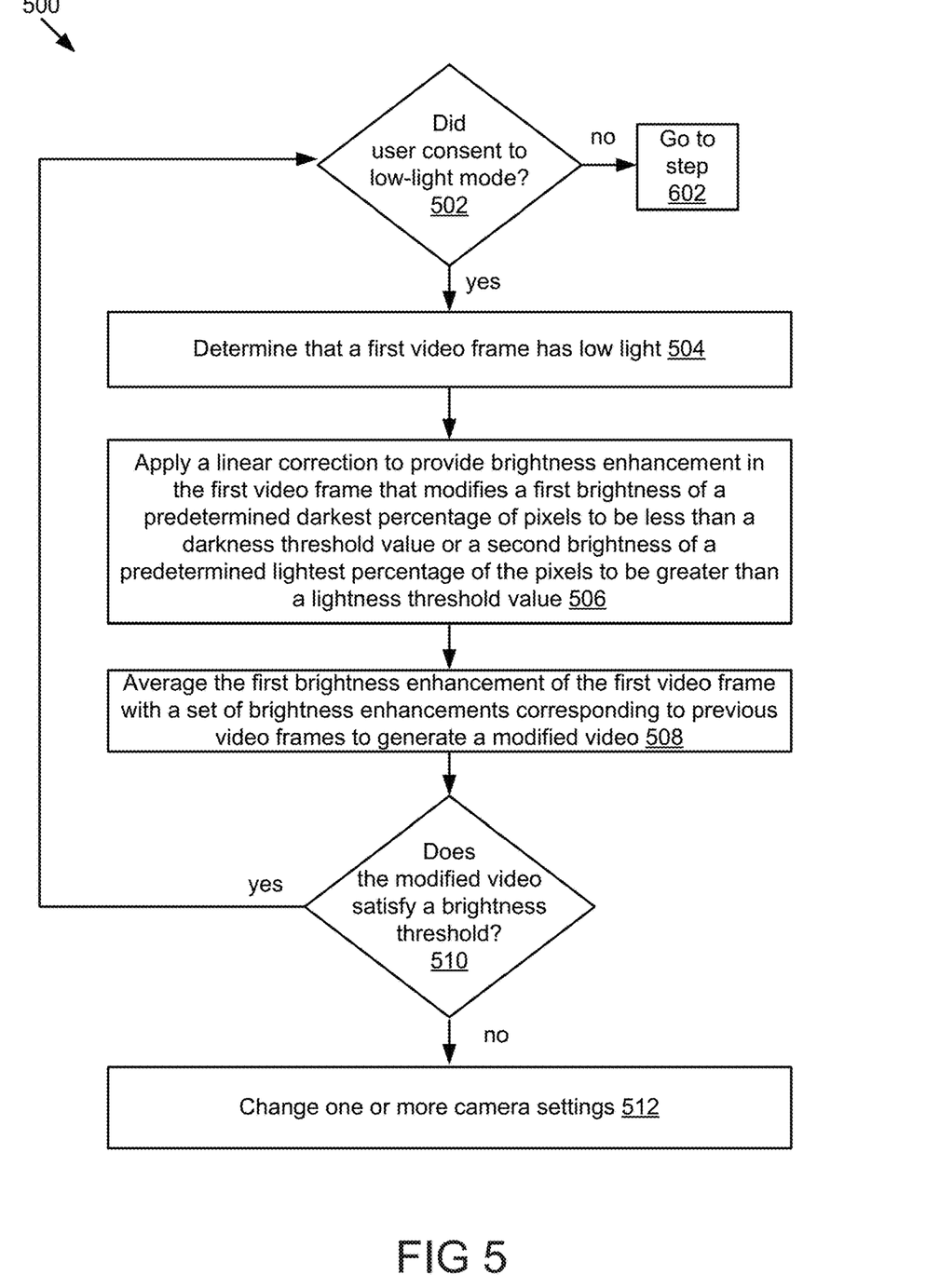
FIG. 5 illustrates a flowchart of an example method to enhance a brightness of a video frame according to some embodiments.

FIG. 5 illustrates a flowchart of an example method 500 to enhance a brightness of a video frame. The method 500 is performed by a video application 103 stored on a computing device 200, such as a user device 115, a video server 101, or in part a user device 115 and in part a video server 101.

At block 502, it is determined whether a user consented to low-light mode. If the user did not consent to low-light mode, the method 500 proceeds to step 602 in FIG. 6. If the user consented to low-light mode, at block 504, it is determined that a first video frame has low light. At block 506, a linear correction is applied to provide a brightness enhancement in the first video frame that modifies a first brightness of a predetermined darkest percentage of pixels to be less than a darkness threshold value or a second brightness of a predetermined lightest percentage of the pixels to be greater than a lightness threshold value. Other correction methods may be used instead or in addition, such as the CLAHE correction. At block 508, the first brightness enhancement of the first video frame is averaged with a set of brightness enhancements corresponding to previous video frames to generate a modified video.

At block 510, it is determined whether the modified video satisfies a brightness threshold. If the modified video satisfies a brightness threshold, the method 500 proceeds with the next video frame. The video application 103 may also transmit the modified video to user device 115n and/or display the modified video in the display 245 of the user device 115a. For example, the brightness module 206 may analyze every $30^{th}$ video frame. If the modified video fails to satisfy the brightness threshold, the method 500 proceeds to block 512 and one or more camera settings are changed.

Figure 6:
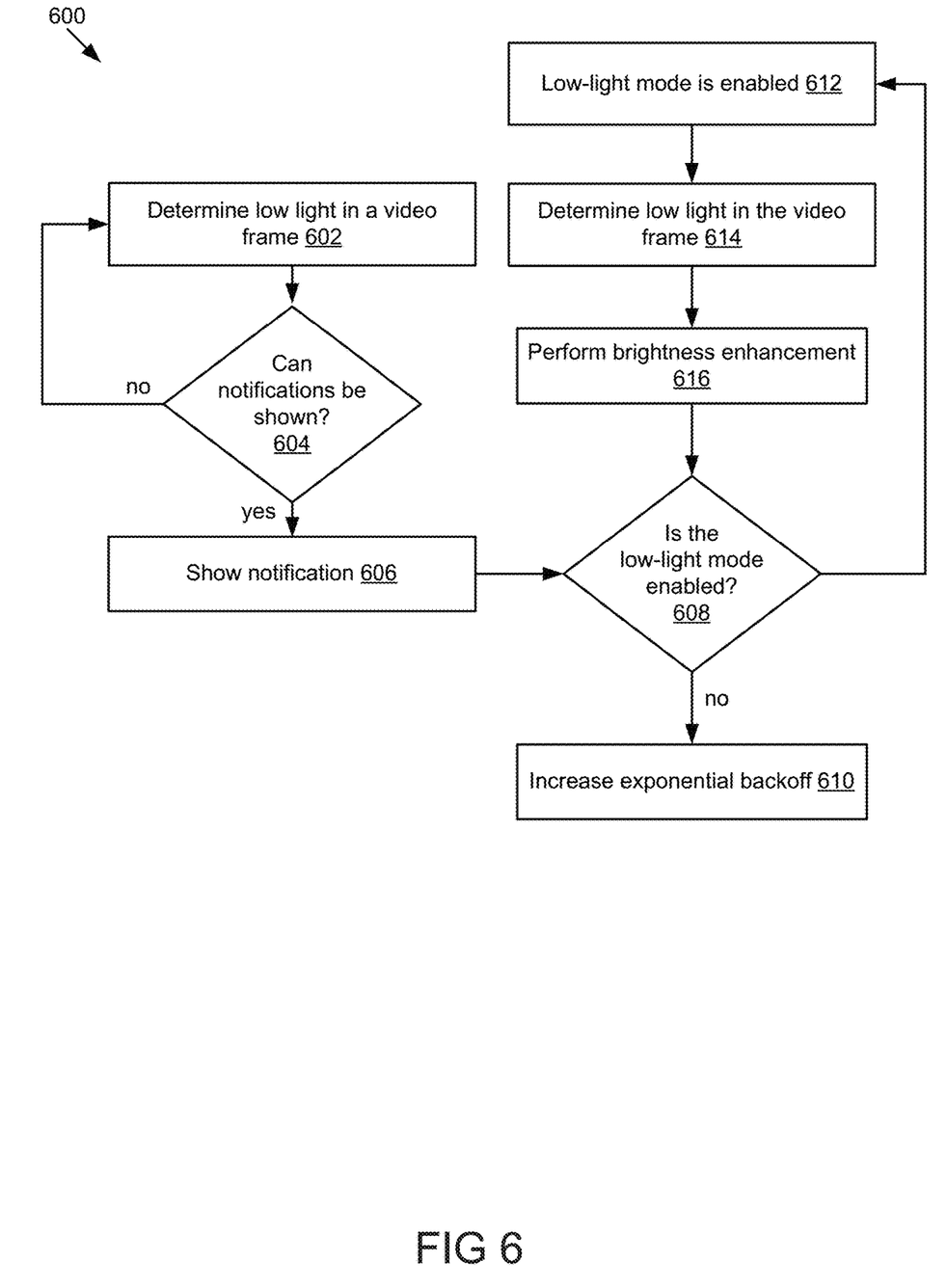
FIG. 6 illustrates a flowchart of an example method to obtain user consent to enable low-light mode according to some embodiments.

FIG. 6 illustrates a flowchart of an example method 600 to obtain user consent to enable low-light mode according to some embodiments. At block 602, it is determined that there is low light in a video frame. At block 604, it is determined whether notifications can be shown 604. If notifications cannot be shown, the method 600 returns to block 602. If notifications can be shown, at block 606 a notification is shown. The notification may include a message, such as "Low light has been detected. Would you like to enable low-light mode?"

At block 608, it is determined whether low-light mode is enabled. If low-light mode is not enabled, the method 600 proceeds to block 610 where an exponential backoff is increased. For example, if the user does not want to enable low-light mode, the next notification is not shown for another day, five days, 25 days, 125 days, etc. If low-light mode is enabled, the method 600 proceeds to block 612.

At block 612, low-light mode is enabled. At block 614, low light is determined in the video frame. At block 616, brightness enhancement is performed and the method 600 continues to block 608.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A method to enhance brightness in video frames of a video during streaming, the method comprising:
   determining, by a processor, that a first video frame has low light;
   determining a total brightness of the first video frame by calculating a square root of a summation of an average brightness of a set of video frames where each frame in the set of video frames is squared;
   determining a multiplier that is a particular value divided by the total brightness; and
   determining a final output value by multiplying the multiplier by a square root of a summation of an input value for the first video frame squared.

2. The method of claim 1, further comprising:
   downscaling, by a graphics processing unit (GPU) distinct from the processor, the first video frame, wherein the first video frame is stored in a GPU memory of the GPU and wherein the GPU memory is not accessible by the processor;
   transferring, by the GPU, the downscaled first video frame to a computer processing memory accessible by the processor;
   generating, by the processor, a histogram of brightness of the downscaled first video frame;
   determining corresponding pixels that match a predetermined darkest percentage of pixels and corresponding pixels that match a predetermined lightest percentage of pixels, wherein the histogram of brightness is used to determine corresponding pixels that match the predetermined darkest percentage of pixels and corresponding pixels that match the predetermined lightest percentage of pixels; and
   applying, by the GPU, a linear correction to the first video frame to provide a first brightness enhancement that modifies a first brightness of the predetermined darkest percentage of pixels to be less than a darkness threshold value or a second brightness of the predetermined lightest percentage of the pixels to be greater than a lightness threshold value.

3. The method of claim 2, wherein a brightness of a number of video frames in the set of video frames that are averaged is based on at least one of a frame speed of the video or an input brightness of the first video frame.

4. The method of claim 2, further comprising:
   averaging, by the processor, the first brightness enhancement of the first video frame with a set of brightness enhancements corresponding to previous video frames to generate a modified video.

5. The method of claim 4, wherein the video frames are captured by a camera coupled to the processor, the method further comprising:
   determining, by the processor, whether the modified video meets a brightness threshold;
   responsive to determining that the modified video does not meet the brightness threshold, changing, by the processor, one or more camera settings; and
   responsive to determining that the modified video does meet the brightness threshold, displaying the modified video.

6. The method of claim 5, wherein changing the one or more camera settings includes at least one of increasing an exposure time or modifying a sensitivity of an image sensor.

7. The method of claim 1, wherein the first video frame is determined to have low light based on at least one of an ambient light sensor value failing to meet a first threshold value or an exponential moving average frame brightness fails to meet a second threshold value.

8. The method of claim 1, further comprising:
   applying contrast limited adaptive histogram equalization (CLAHE) to the first video frame.

9. The method of claim 8, wherein applying the CLAHE to the first video frame includes: (a) applying CLAHE to a luma channel of the first video frame, (b) applying CLAHE to each chroma channel of the first video frame, and (c) blending results from (a) and (b).

10. The method of claim 1, wherein the multiplier is 0.5.

11. The method of claim 1, wherein determining the total brightness includes:
   determining that a first total brightness of the set of video frames exceeds a threshold value;
   responsive to the first total brightness exceeding the threshold value, removing a second frame from the set of video frames; and
   calculating a second total brightness.

12. A non-transitory computer-readable medium to enhance brightness in video frames of a video with instructions that, when executed by one or more processors, cause the one or more processors to perform operations, the operations comprising:
   determining that a first video frame has low light; and
   applying contrast limited adaptive histogram equalization (CLARE) to the first video frame by:
   (a) applying CLAHE to a luma channel of the first video frame;
   (b) applying CLAHE to each chroma channel of the first video frame; and
   (c) blending results from (a) and (b).

13. The computer-readable medium of claim 12, wherein the operations further comprise:
   downscaling, by a graphics processing unit (GPU) distinct from the processor, the first video frame, wherein the first video frame is stored in a GPU memory of the GPU and wherein the GPU memory is not accessible by the processor;

transferring, by the GPU, the downscaled first video frame to a computer processing memory accessible by the processor;

generating, by the processor, a histogram of brightness of the downscaled first video frame, determining corresponding pixels that match a predetermined darkest percentage of pixels and corresponding pixels that match a predetermined lightest percentage of pixels, wherein the histogram of brightness is used to determine corresponding pixels that match the predetermined darkest percentage of pixels and corresponding pixels that match the predetermined lightest percentage of pixels; and applying, by the GPU, a linear correction to the first video frame to provide a first brightness enhancement that modifies a first brightness of the predetermined darkest percentage of pixels to be less than a darkness threshold value or a second brightness of the predetermined lightest percentage of the pixels to be greater than a lightness threshold value.

14. The computer-readable medium of claim 13, wherein a number of video frames in the set of video frames that are averaged is based on at least one of a frame speed of the video or an input brightness of the first video frame.

15. The computer-readable medium of claim 13, wherein the first video frame is determined to have low light based on at least one of an ambient light sensor value failing to meet a first threshold value or an exponential moving average frame brightness fails to meet a second threshold value.

16. The computer-readable medium of claim 13, wherein the operations further include:

averaging the first brightness enhancement of the first video frame with a set of brightness enhancements corresponding to previous video frames to generate a modified video.

17. A system comprising:

one or more processors; and a memory that stores instructions executed by the one or more processors, the instructions comprising:

determining that a first video frame has low light;

determining a total brightness of the first video frame by calculating a square root of a summation of an average brightness of a set of video frames where each frame in the set of video frames is squared;

determining a multiplier that is a particular value divided by the total brightness; and determining a final output value by multiplying the multiplier by a square root of a summation of an input value for the first video frame squared.

18. The system of claim 17, wherein the instructions further comprise:

downscaling, by a graphics processing unit (GPU) distinct from the processor, the first video frame, wherein the first video frame is stored in a GPU memory of the GPU and wherein the GPU memory is not accessible by the processor;

transferring, by the GPU, the downscaled first video frame to a computer processing memory accessible by the processor;

generating, by the processor, a histogram of brightness of the downscaled first video frame determining corresponding pixels that match a predetermined darkest percentage of pixels and corresponding pixels that match a predetermined lightest percentage of pixels;

applying, by the GPU, a linear correction to the first video frame to provide a first brightness enhancement that modifies a first brightness of the predetermined darkest percentage of pixels to be less than a darkness threshold value or a second brightness of the predetermined lightest percentage of the pixels to be greater than a lightness threshold value;

wherein the histogram of brightness is used to determine corresponding pixels that match the predetermined darkest percentage of pixels and corresponding pixels that match the predetermined lightest percentage of pixels.

19. The system of claim 18, wherein a number of video frames in the set of video frames that are averaged is based on at least one of a frame speed of the video or an input brightness of the first video frame.

20. The system of claim 18, wherein the instructions further comprise:

averaging the first brightness enhancement of the first video frame with a set of brightness enhancements corresponding to previous video frames to generate a modified video.

* * * * *